No. 800,662. PATENTED OCT. 3, 1905.
W. E. MARTIN.
MACHINE FOR TURNING HAY, CORN, CLOVER, AND SIMILAR CROPS.
APPLICATION FILED MAR. 26, 1904.

5 SHEETS—SHEET 2.

(Part of)

Witnesses:
Jno. R. Adams
H. H. Simms.

Inventor:
William Edward Martin
By Knight & Bro
attys.

No. 800,662. PATENTED OCT. 3, 1905.
W. E. MARTIN.
MACHINE FOR TURNING HAY, CORN, CLOVER, AND SIMILAR CROPS.
APPLICATION FILED MAR. 26, 1904.
5 SHEETS—SHEET 3.
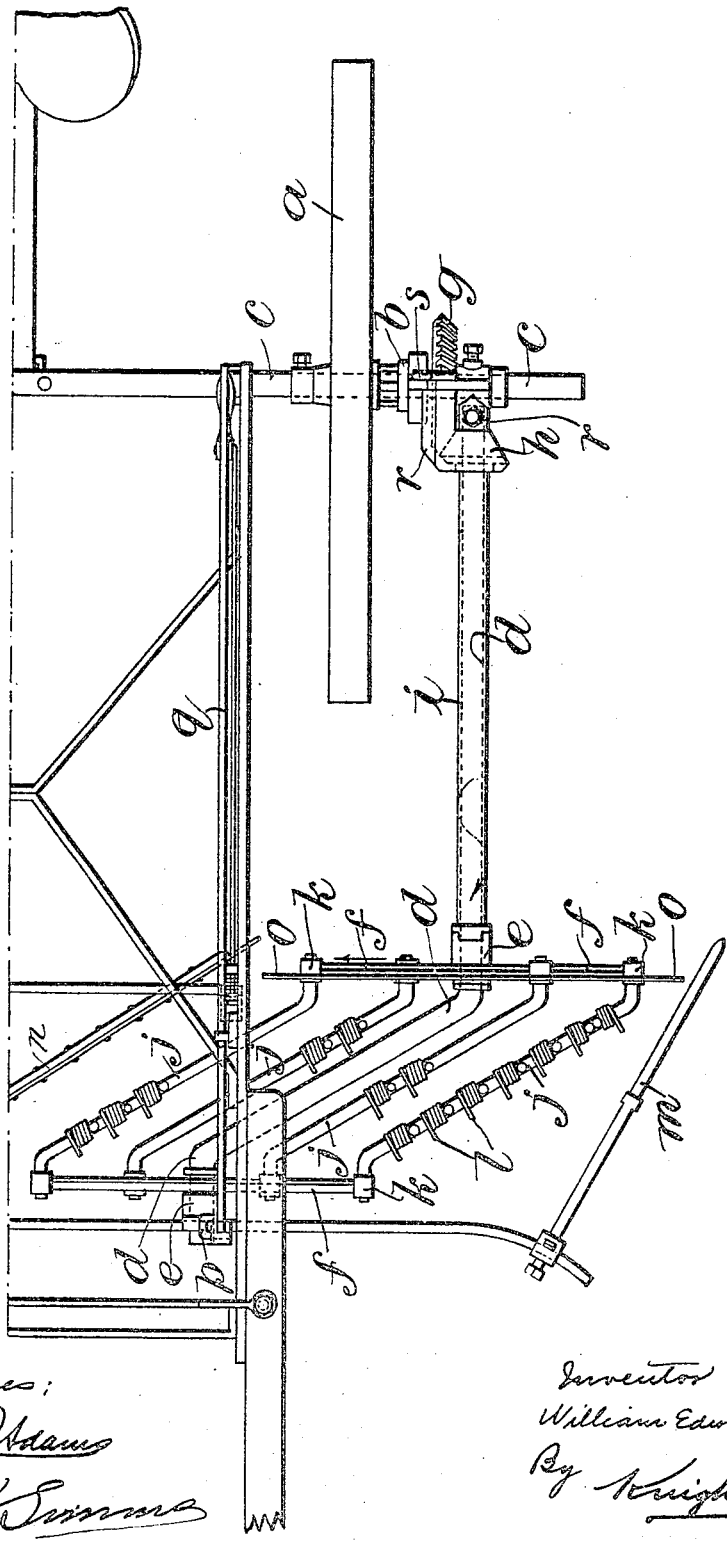

No. 800,662. PATENTED OCT. 3, 1905.
W. E. MARTIN.
MACHINE FOR TURNING HAY, CORN, CLOVER, AND SIMILAR CROPS.
APPLICATION FILED MAR. 26, 1904.

5 SHEETS—SHEET 4.

No. 800,662. PATENTED OCT. 3, 1905.
W. E. MARTIN.
MACHINE FOR TURNING HAY, CORN, CLOVER, AND SIMILAR CROPS.
APPLICATION FILED MAR. 26, 1904.
5 SHEETS—SHEET 5.
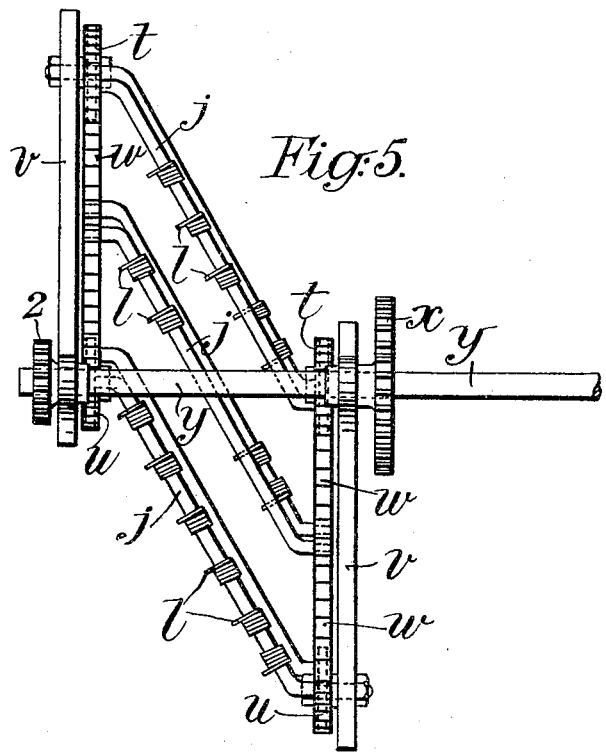
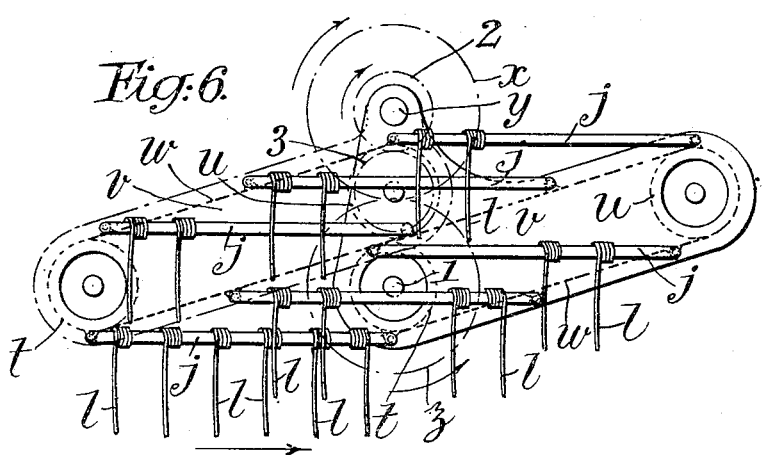

UNITED STATES PATENT OFFICE.

WILLIAM E. MARTIN, OF STAMFORD BARON, ENGLAND.

MACHINE FOR TURNING HAY, CORN, CLOVER, AND SIMILAR CROPS.

No. 800,662.　　　　Specification of Letters Patent.　　　　Patented Oct. 3, 1905.

Application filed March 26, 1904. Serial No. 200,138.

*To all whom it may concern:*

Be it known that I, WILLIAM EDWARD MARTIN, a subject of the King of Great Britain, residing at Stamford Baron, in the county of Northampton, England, have invented certain new and useful Improvements in Machines for Turning Hay, Corn, Clover, and Similar Crops, of which the following is a full, clear, and exact description.

The object of the present invention is to construct a swath-turner which is light, easy running, silent, very efficient in use, and will not damage the crop by knocking out the seed or by knocking the leaf off, as is the case with other swath-turners, the turning mechanism being preferably placed at an angle to the line of draft and the teeth of which are always in a hanging or vertical position. Therefore each rake after turning its portion of the swath leaves the same gently and has no tendency to carry any of it round or allow it to fall back again. Although only one rake at a time is actually engaged in the turning operation, the action is continuous, because directly one rake has picked up its portion of the swath the next rake commences on the next portion, and so on. Therefore the whole swath is turned over completely onto fresh ground.

The invention is illustrated in the accompanying drawings, in which—

Figure 1:
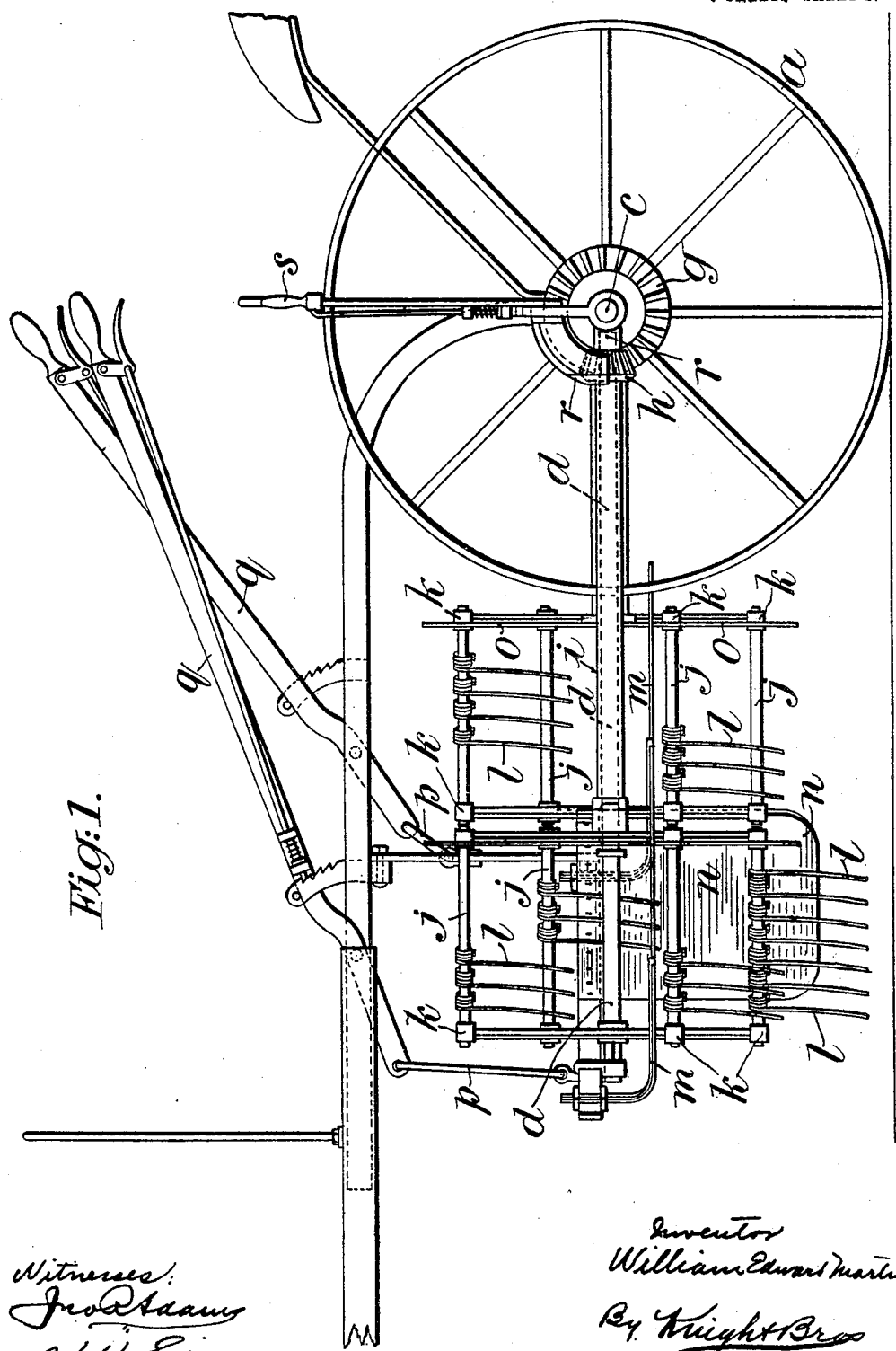
Figure 2:
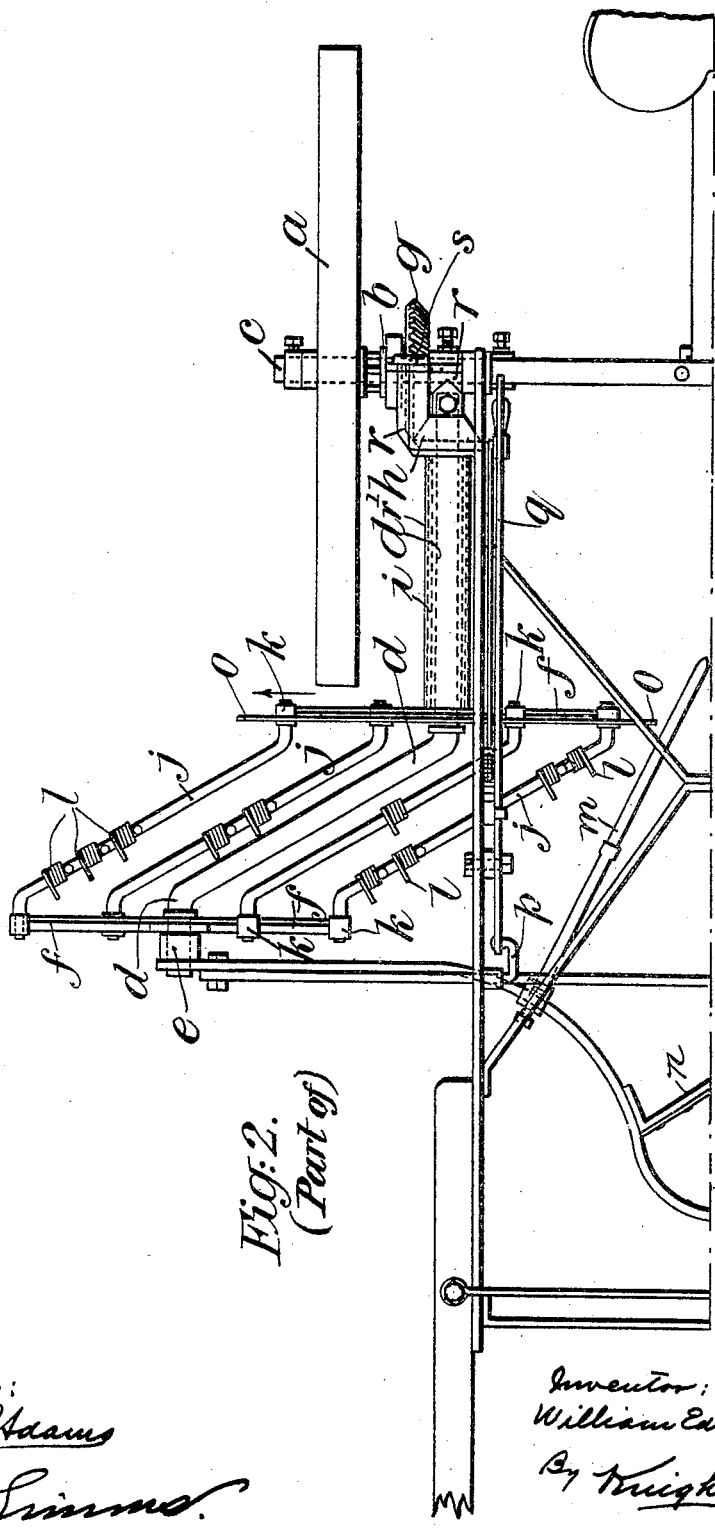
Figure 3:
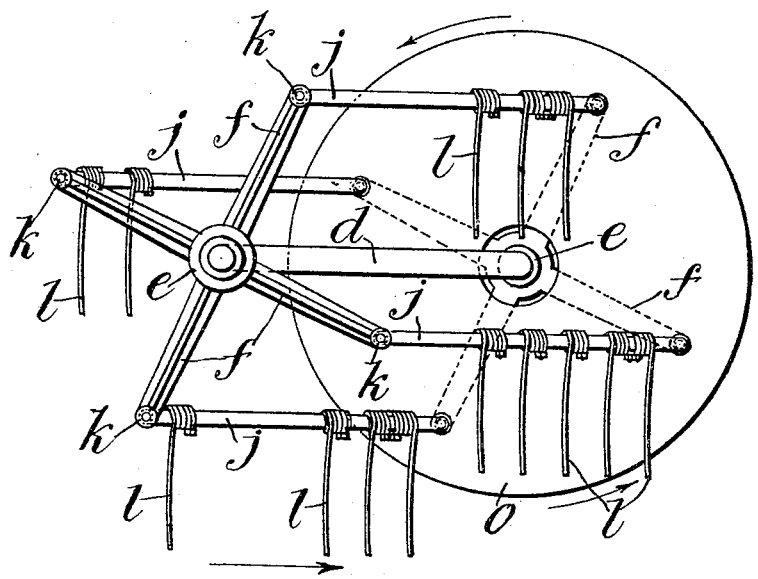
Figure 4:
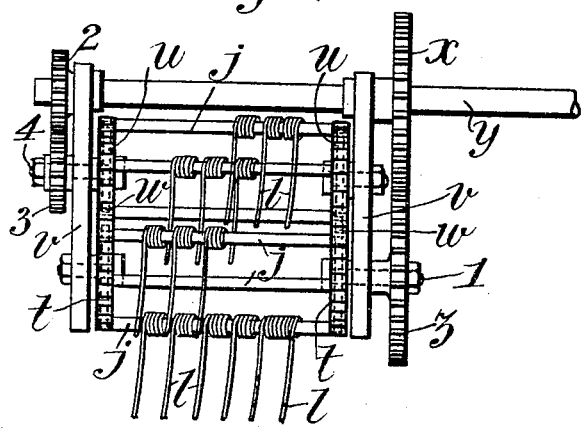

Figure 1 is a side elevation, and Fig. 2 a plan, of a complete machine. Fig. 3 is a front elevation of one set of forks or rakes and their carrying mechanism. Figs. 4, 5, and 6 are respectively a side elevation, plan, and front view of a modified form of part of the machine.

In carrying the invention into effect I construct a machine having a pair of carrying-wheels *a*, one or both of which may be the driver or drivers for clutch-sleeves *b*, capable of connecting the clutches on the wheels *a* with those on the bevel-wheels *g*.

Extending in front of the main axle *c*, as shown in Figs. 1 and 2, is or are arranged one or more carrying-arms *d*. It will be understood that these arms *d* may be arranged at the rear of the main axle *c*, if desired. Each of these longitudinal carrying-arms *d* is bent obliquely sidewise in a horizontal direction and is then bent parallel to the main or primary portion thereof. On each of these parallel portions at the ends of the obliquely-bent part I mount a hub or sleeve *e*, each fitted or formed with a series of radial arms *f*, and one or both of these hubs or sleeves *e* is or are driven in any convenient manner.

In the drawings I have shown bevel-wheels *g* mounted on the axle *c* and driven by the clutch-sleeves *b*, said wheels *g* gearing with bevel-pinions *h*, connected to the sleeves *i*, arranged around the carrying-arms *d*, which sleeves are connected with the driven hubs *e* by clutches or other convenient means.

I connect each of the outer ends of the radial arms *f* on one (the rearward) hub *e* with a radial arm *f* on its coacting (the forward) hub *e* by means of links or rake-heads *j*, the ends of which are formed parallel with the two parallel ends of the bent portion of the carrying-arm *d*. These parallel ends pass through bearings *k* in the ends of the radial arms *f* and are there retained in position in any convenient manner. Fixed to these said links or rake-heads *j* are a number of tines *l*, preferably spring-tines, as shown, which hang downward therefrom and which may be bent slightly forward, thus forming hanging forks or rakes. When the machine is in motion, the rake-heads *j* are revolved, but owing to the manner in which they are connected to the radial arms they cannot turn over, the result being that the forks or rakes always move round in a hanging position parallel to each other at an angle to the longitudinal line of the machine. The tines *l* of the forks or rakes catch the swath, turn the same completely over, and owing to the fact that they are always in a hanging position they leave the swath easily and have no tendency to let it fall back or to carry away any portion of it as the forks or rakes move round.

In place of the bent carrying-arms *d* hereinbefore mentioned I may mount the hubs for the radial arms on suitable bearings attached to the frame of the machine in the same positions as above indicated.

I preferably provide the rear sets of the radial arms *f* with stripping-bars *m*, which cause the swath to leave the forks or rakes more easily, and I also provide a plate *n* between the two sets of forks or rakes to obviate the chance of the one swath being thrown into the other set of rakes when acting on a heavy crop, and I provide disks *o*, carried by the rear sets of radial arms *f*, to prevent the swath being blown about as it is being turned over.

The front ends of the arms *d* are carried in bearings supported by links *p*, controlled by levers *q*, whereby the height of the tines or rakes *l* may be regulated with respect to the ground or swath. The rear ends of the arms $d$ are carried by castings $r$, mounted on the axle $c$. Such castings partially cover the bevel-wheels $g\ h$, and that one supporting the shorter arm $d$ has also fixed thereto a light non-revolving guard $r'$, which covers the rotating sleeve $i$.

As usual in agricultural machines, each driving-wheel $a$ is provided with a clutch $b$ and clutch-lever $s$ to enable either of the bevel-wheels $g$ to be thrown out of action.

In the modified form of machine shown in Figs. 4, 5, and 6 I mount two chain-wheels $t\ u$ in alinement in each of two frames $v$. These frames $v$ are arranged laterally across the machine one in advance of the other, each frame being arranged at an angle to the horizontal positions and one frame being arranged sidewise with relation to the other frame. The centers of the two lower chain-wheels $t$ and two upper chain-wheels $u$ are in the same horizontal planes. The links or rake-heads $j$, as shown in Figs. 4, 5, and 6, are made identical with the links or rake-heads shown in Figs. 1, 2, and 3, their ends passing through bearings in the chains $w$. The forks or rakes, consisting of the links or rake-heads $j$ and tines $l$, act upon the swath in exactly the same manner as the forks or rakes shown in Figs. 1, 2, and 3. If desired, the chains $w$ may be formed with pivots projecting sidewardly from the links of the chain, said pivots entering holes formed in the ends of the links or rake-heads; but as this modification is so obvious it is not shown. In the drawings I have shown a toothed wheel $x$ on a driven shaft $y$, giving motion to a toothed wheel $z$, which latter is mounted on one end of a short shaft 1, on the other end of which is mounted one of the chain-wheels $t$, driving one of the chains $w$. The shaft $y$ passes across all the forks or rakes and is provided with a toothed wheel 2, gearing with a toothed wheel 3, mounted on one end of a short shaft 4, on the other end of which is mounted one of the chain-wheels $u$, driving the other chain $w$.

Owing to the peculiar shape of the links or rake-heads $j$, the tines $l$ are retained in the vertical position, and the forks or rakes, consisting of the links or rake-heads $j$ and tines $l$, cannot be moved out of such vertical position even when the tines $l$ encounter an obstacle or if an attempt is made to move them out of the vertical position. The action of the forks or rakes upon the swath is very similar to the action of the forks or rakes when the swath is turned by hand-labor.

I am aware that the rakes can be controlled so that their teeth always retain a hanging position by means of eccentrics and links, gearing, cams, or other mechanism acting on the rake-heads; but I prefer to employ the means herein described.

Having now particularly described and ascertained the nature of my said invention and in what manner the same is to be performed, I declare that what I claim is—

1. A swath-turner having a plurality of turning mechanisms, each turning mechanism adapted to turn a portion of each swath onto fresh ground, and provided with a number of revolving rakes set obliquely to the line of travel of the machine and means by which the teeth are always controlled in a vertical hanging position and mechanism for moving said teeth in a path at right angles to the line of travel of the machine.

2. A swath-turner having a plurality of turning mechanisms, each turning mechanism adapted to turn a portion of each swath separately onto fresh ground, and provided with a number of revolving rakes set obliquely to the line of travel of the machine and means by which the teeth are always controlled in a vertical hanging position and mechanism for moving said teeth in a path at right angles to the line of travel of the machine causing them to approach, pass across and recede from the ground.

3. A swath-turner having a number of rakes the tines of which are always in a hanging vertical position, the ends of the parts or heads carrying said tines being formed at opposite angles to the main part thereof and parallel to each other, bearings in which the parallel parts are carried and mechanism causing the bearings and rakes to approach, pass across and recede from the ground, substantially as herein set forth.

4. In a swath-turner the combination of a set of driven radial arms, another set of radial arms arranged eccentrically with respect thereto, rakes carried by the radial arms, acting as links to give motion from one set of radial arms to the other set of radial arms, the ends of said rakes being formed at opposite angles to the main portion thereof and parallel to each other, substantially as set forth.

5. In a swath-turner the combination with the frame thereof of a bent carrying-arm the ends of which are at an angle to the intermediate portion thereof and parallel to each other, hubs carried by said parallel portions, rotating arms carried by said hubs, forks or rakes having vertical tines carried by said arms, the ends of the parts carrying said tines being bent at an angle to the main portion thereof and parallel to each other and to the parallel portions of the carrying-arm, and means for driving the rotating arms, substantially as set forth.

6. A swath-turner having a number of rakes arranged obliquely to the line of travel of the machine, the tines of which are always in a hanging vertical position, the ends of the heads carrying said tines being bent at opposite angles to the main part thereof, parallel to each other and parallel to the line of travel of the machine, bearings in which the parallel parts are carried and mechanism causing the bearings and rakes to approach, pass across and recede from the ground, substantially as herein set forth.

7. A swath-turner having a number of rakes the tines of which are always in a hanging vertical position, the two ends of the head carrying said tines being bent one on one side and the other on the other of the main part or head at opposite angles thereto and parallel to each other, bearings in which the parallel parts are carried and mechanism causing the bearings and rakes to approach, pass across and recede from the ground, substantially as herein set forth.

8. A swath-turner having a number of rakes the tines of which are always in a hanging vertical position, the ends of the heads carrying said tines being formed at opposite angles to the main part thereof and parallel to each other, bearings which rotate around said parallel parts and mechanism causing the bearings in rotating to approach, pass across and recede from the ground, substantially as herein set forth.

In witness whereof I have hereunto set my hand in presence of two witnesses.

W. E. MARTIN.

Witnesses:
CLAUDE K. MILLS,
H. D. JAMESON.